US008197072B2

(12) United States Patent
Kwon et al.

(10) Patent No.: US 8,197,072 B2
(45) Date of Patent: Jun. 12, 2012

(54) LIGHT EMITTING DEVICE FOR PORTABLE COMMUNICATION DEVICE HAVING DIGITAL LIGHT PROCESSING PROJECTOR AND LIQUID CRYSTAL DISPLAY

(75) Inventors: Jin-Wook Kwon, Suwon-si (KR); Yong-Chan Keh, Seongnam-si (KR); Byeong-Hoon Park, Suwon-si (KR); Sung-Sun Kim, Seoul (KR)

(73) Assignee: Samsung Electronics Co., Ltd (KR)

( * ) Notice: Subject to any disclaimer, the term of this patent is extended or adjusted under 35 U.S.C. 154(b) by 265 days.

(21) Appl. No.: 12/629,534

(22) Filed: Dec. 2, 2009

(65) Prior Publication Data

US 2010/0134767 A1 Jun. 3, 2010

(30) Foreign Application Priority Data

Dec. 2, 2008 (KR) .................. 10-2008-0121165

(51) Int. Cl.
*G03B 21/28* (2006.01)

(52) U.S. Cl. ............ 353/99; 353/30; 353/31; 353/28; 353/29; 353/63; 353/98; 353/119; 353/122; 348/771; 348/790

(58) Field of Classification Search .............. 353/30, 353/31, 28, 29, 37, 63, 68, 98, 99, 119, 122; 359/291, 298, 237, 242, 618, 621, 726, 831, 359/834, 837, 857, 885, 891, 892; 349/5, 349/6, 7, 8, 9; 348/771, 790; 345/102; 362/97.2
See application file for complete search history.

(56) References Cited

U.S. PATENT DOCUMENTS

| 6,474,819 | B2 * | 11/2002 | Yoder et al. ............... 353/98 |
| 6,517,211 | B2 * | 2/2003 | Mihara ..................... 353/98 |
| 7,106,505 | B2 * | 9/2006 | Whitehead et al. ......... 359/443 |
| 7,113,324 | B2 * | 9/2006 | Lee et al. ................. 359/298 |
| 7,144,133 | B2 * | 12/2006 | Bierhuizen .............. 362/293 |
| 7,207,677 | B2 * | 4/2007 | Takeda et al. ............. 353/31 |
| 7,959,305 | B2 * | 6/2011 | Destain ................... 353/99 |
| 2002/0149852 | A1* | 10/2002 | Dubinovsky et al. ...... 359/618 |
| 2004/0150794 | A1* | 8/2004 | Kurtz et al. .............. 353/31 |
| 2007/0053074 | A1* | 3/2007 | Krijn et al. ............. 359/726 |
| 2008/0151196 | A1* | 6/2008 | Kinoshita ................. 353/69 |
| 2008/0204394 | A1 | 8/2008 | Cho |
| 2009/0161040 | A1* | 6/2009 | Khan et al. .............. 349/69 |

FOREIGN PATENT DOCUMENTS

| KR | 100727856 | 6/2007 |
| KR | 1020080079005 | 8/2008 |

\* cited by examiner

*Primary Examiner* — Georgia Y Epps
*Assistant Examiner* — Sultan Chowdhury
(74) *Attorney, Agent, or Firm* — The Farrell Law Firm, P.C.

(57) ABSTRACT

Provided is a light emitting device of an electronic device, provided with a DLP (Digital Light Processing) projector and a display unit, which is configured in such a manner that the light generated by the operation of the DLP projector can be re-used as a backlight light of the display unit. The disclosed light emitting device includes a first mirror for projecting a light of the DLP projector on a flat area provided ahead of the first mirror in an intermediate operation state of the first mirror; a light concentration mirror for converging the light projected on the flat area, the light concentration mirror being provided at a position adjacent to the flat area; and an optical fiber for transferring the light converged by the light concentration mirror to the display unit and enabling re-use of the transferred light as a light for a backlight of the display unit.

12 Claims, 4 Drawing Sheets

LIGHT EMITTING DEVICE FOR PORTABLE COMMUNICATION DEVICE HAVING DIGITAL LIGHT PROCESSING PROJECTOR AND LIQUID CRYSTAL DISPLAY

PRIORITY

This application claims priority to an application entitled "Light Emitting Device for Portable Communication Device Having Digital Light Processing Projector and Liquid Crystal Display" filed with the Korean Intellectual Property Office on Dec. 2, 2008 and assigned Serial No. 10-2008-0121165, the contents of which are incorporated herein by reference.

BACKGROUND OF THE INVENTION

1. Field of the Invention

The present invention relates to a light emitting device for an electronic device, provided with a Digital Light Processing (DLP) projector and a display unit, in which the light generated by the operation of the DLP projector is re-used as a backlight light of the display unit, as a Liquid Crystal Display (LCD).

2. Description of the Related Art

Electronic devices have been recently miniaturized and manufactured as multi-functional devices according to consumers' requirements. Also, due to the digitalization of data, multi-functions, including voice communication, radio-listening, downloading Motion Picture experts' group audio layer-3 (MP3) music via internet connection, acquiring information (e.g., various data and images), etc., can be easily achieved via electronic devices, such as a portable communication device, a Personal Digital Assistant (PDA), a computer, a notebook computer, etc.

Moreover, as a data output device for an electronic device, a display unit such as a Liquid Crystal Display (LCD) is generally used. In general, a keypad used for data input includes the arrangement of multiple keys. A portable communication device from among such electronic devices is divided into various types of terminals according to the appearance of the device: a bar-type terminal, in which a communication device, and input/output devices are provided in one housing; a flip-type terminal including a bar-type terminal with a rotatably provided flip cover; a folder-type terminal with a pair of housings, the housings being rotatably provided in a direction toward and away from each other; and a sliding-type terminal in which a pair of housings are adapted to slide while facing each other.

Meanwhile, mobile communication services were limited to voice calling and transmission of short messages in early stages, but has shown a tendency to spread into various service areas, including customized videos, music videos, reproduction of movie/music files, television, games, and mobile banking, with the continuing development of mobile communication technologies.

In order to enjoy multimedia services, such as customized videos, music videos, reproduction of movie/music files, TV watching, it is necessary to view a screen displayed through a display unit.

However, since the display unit of the portable communication device has a limited screen size, a projector capable of displaying a large screen can be used by mounting the projector in the portable communication device.

As mentioned above, as the projector mounted in the portable communication device, a DLP (Digital Light Processing) projector is mainly used for miniaturization.

The DLP projector uses a DMD (Digital Micromirror Device) chip, and the DMD chip refers to a semiconductor optical switch having microscopic mirrors arranged on its surface. A DLP-type projector blocks or transmits the light reflecting from the surface of a DMD chip via a circuit board, and displays an image by adjusting the reflective angle based on such a signal.

In the DMD chip, a microscopic aluminum-alloy mirror is provided above one cell of an SRAM (Static Random Access Memory), and the microscopic mirror operates by the electrostatic operation of the underlying memory.

The DLP-type projector employing the DMD chip is divided into a single panel type projector, and a three panel type projector separately using red (R), green (G), and blue (B). Both the single and three panel type projectors are effective digital type projectors and have very high color reproducibility, compared to a conventional method.

The DLP-type projector is advantageous in that the DLP-type projector has a long lifetime, a high sharpness, and can directly reproduce an input digital image signal with an original image quality without additional correction.

As shown in FIG. 1, a DLP projector 1 uses a lamp as an external light source. The DLP projector 1 schematically includes a light emitting diode (LED) 2 emitting red (R), green (G), and blue (B) lights, an optical engine unit (a DMD chip) 3 which converts a light A1 incoming from the LED 2 into an appropriate image signal based on an external input image signal, a projection lens 5 for projecting the light A1 of the image signal converted by the optical engine unit 3 on a screen 4, an optical engine supporter 6 for supporting the LED 2, the optical engine unit 3, and the projection lens 5.

However, as shown in FIGS. 2 and 3, a microscopic mirror 3a of the optical engine unit 3 in the DLP projector is continuously driven in left/right directions with an angle of +/−θ to express an image signal, and is repeatedly placed in a reset state D1 as an intermediate operation state. As shown in FIGS. 2 and 3, the microscopic mirror 3a may be composed of a plurality of independently moving mirrors.

Herein, when the microscopic mirror 3a is placed in the reset state D1, the light A1 of the LED 2 leaks out and is wasted.

In other words, in operation of an electronic device provided with the conventional DLP projector and the display unit as described above, since the display unit (LCD) and the projector must be operated at the same time, the power consumption of the product is increased, thereby reducing a battery usage time of the electronic device.

Accordingly, there exists a need for a light emitting device that converges, for example, the LED 2's light A1 wasted by the reset state D1 of the microscopic mirror in the use of the conventional DLP projector, and re-uses the light A1 as a backlight light of the display unit, which may be an LCD in an electronic device.

SUMMARY OF THE INVENTION

Accordingly, the present invention has been made to solve the above-mentioned problems occurring in the prior art, and the present invention provides a light emitting device of an electronic device, provided with a DLP (Digital Light Processing) projector and a display unit, which converges the light generated by the operation of the DLP projector and re-uses the light as a backlight light of the display unit.

In accordance with an aspect of the present invention, there is provided a light emitting device of an electronic device, provided with a DLP projector and a display unit, the light emitting device including a first mirror for projecting a light of the DLP projector on a flat area provided ahead of the first mirror in an intermediate operation state of the first mirror; a light concentration mirror for converging the light projected on the flat area, the light concentration mirror being provided at a position adjacent to the flat area; and an optical fiber for transferring the light converged by the light concentration mirror to the display unit and enabling re-use of the transferred light as a light for a backlight of the display unit.

In accordance with another aspect of the present invention, a method for providing backlight in an electronic device is provided. The electronic device has a light emitting device provided with a DLP (Digital Light Processing) projector and a display unit. The method includes projecting, by a first mirror, a light of the DLP projector on a flat area provided ahead of the first mirror in an intermediate operation state of the first mirror; converging, by a light concentration mirror, the light projected on the flat area, the light concentration mirror being provided at a position adjacent to the flat area; transferring, by an optical fiber, the light converged by the light concentration mirror to the display unit; and re-using the transferred light as a backlight light of the display unit.

BRIEF DESCRIPTION OF THE DRAWINGS

The above and other features, aspects, and advantages of the present invention will be more apparent from the following detailed description taken in conjunction with the accompanying drawings, in which.

DETAILED DESCRIPTION OF EMBODIMENTS OF THE INVENTION

Hereinafter, embodiments of the present invention will be described in detail with reference to the accompanying drawings. Also, in the following description, a detailed description of known functions and configurations incorporated herein will be omitted when it may obscure the subject matter of the present invention. Further, it should be noted that only parts essential for understanding the operations according to the present invention will be described and a description of parts other than the essential parts will be omitted in order not to obscure the present invention.

Figure 1:
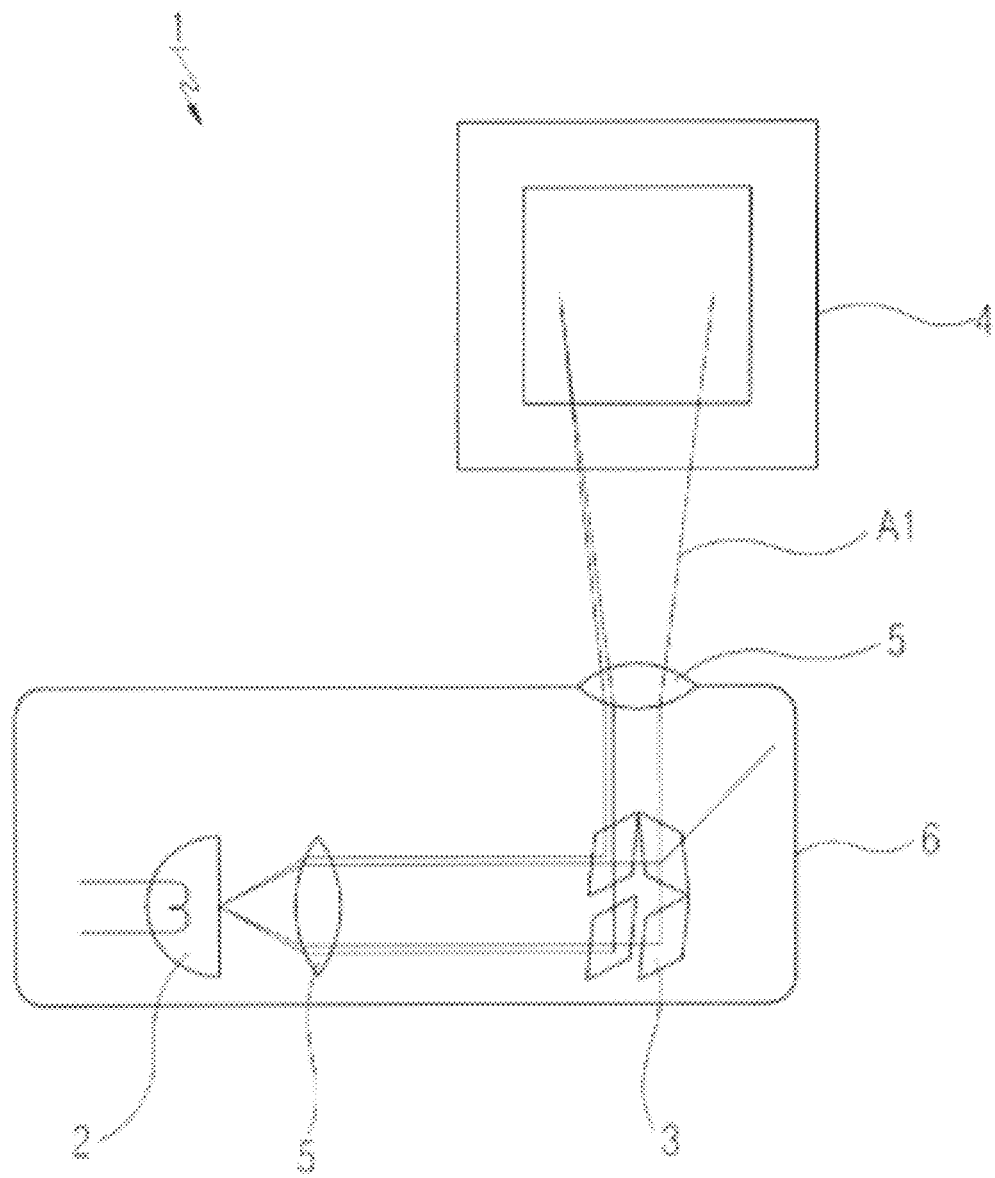
FIG. 1 is a schematic view showing the configuration of a conventional DLP (Digital Light Processing) projector.
Figure 2:
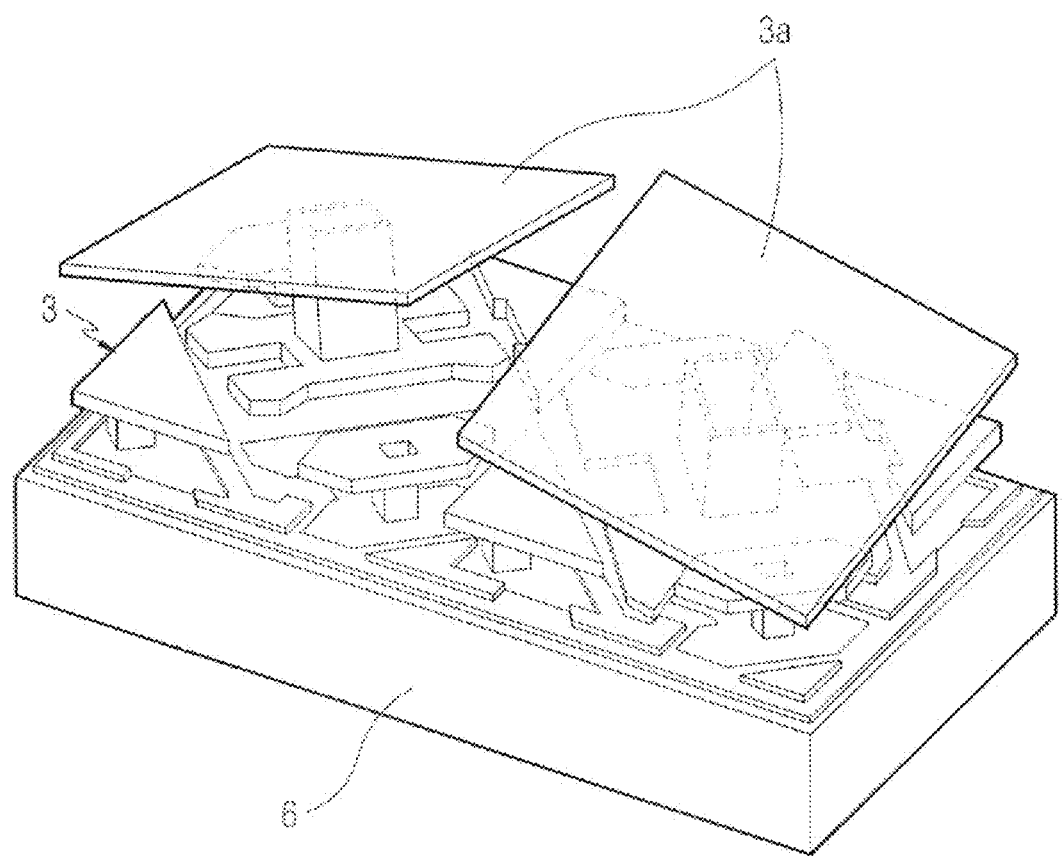
FIG. 2 is a perspective view illustrating an optical engine unit in the configuration of a conventional DLP projector.
Figure 3:
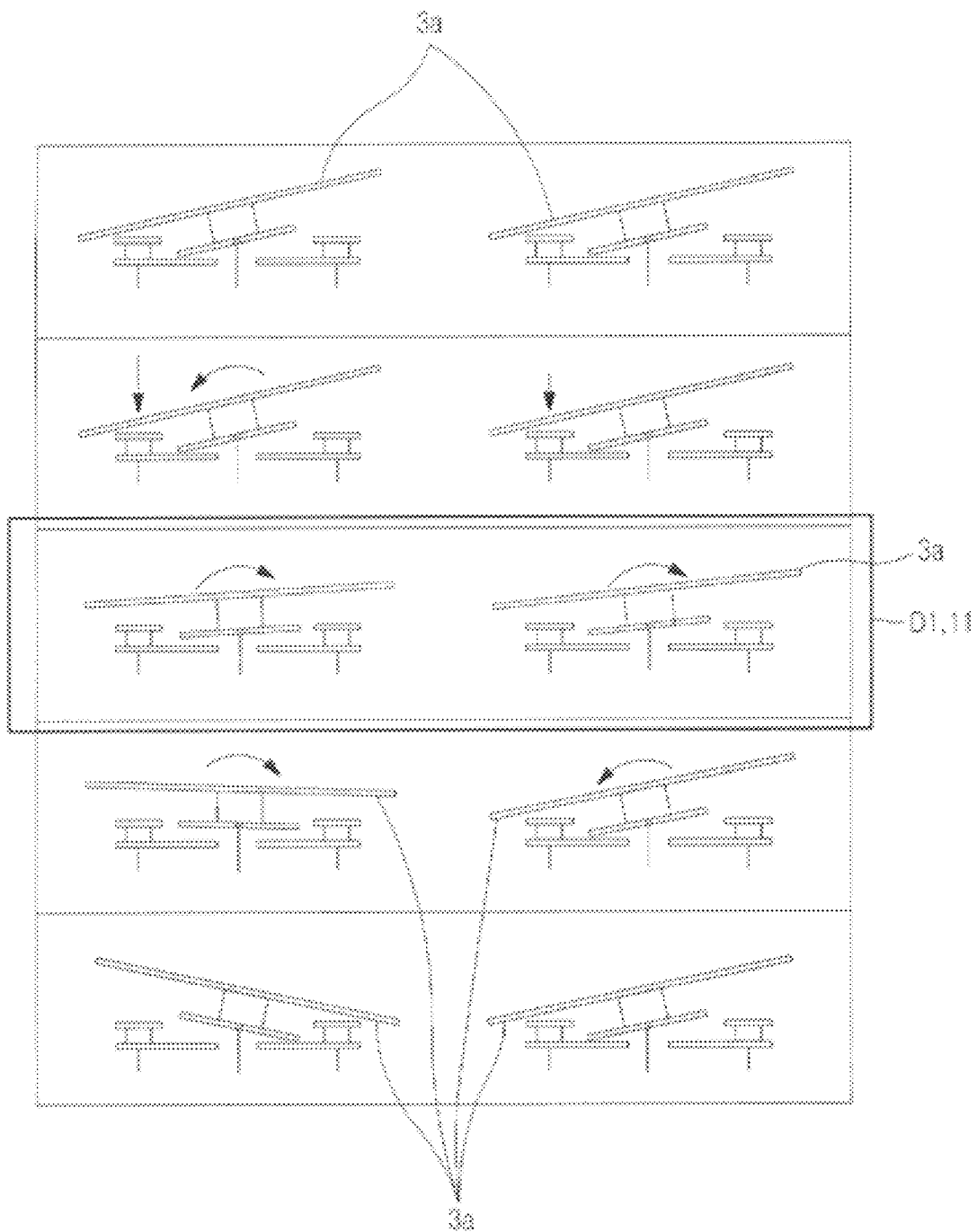
FIG. 3 is a view showing the operation state of a conventional DLP projector.
Figure 4:
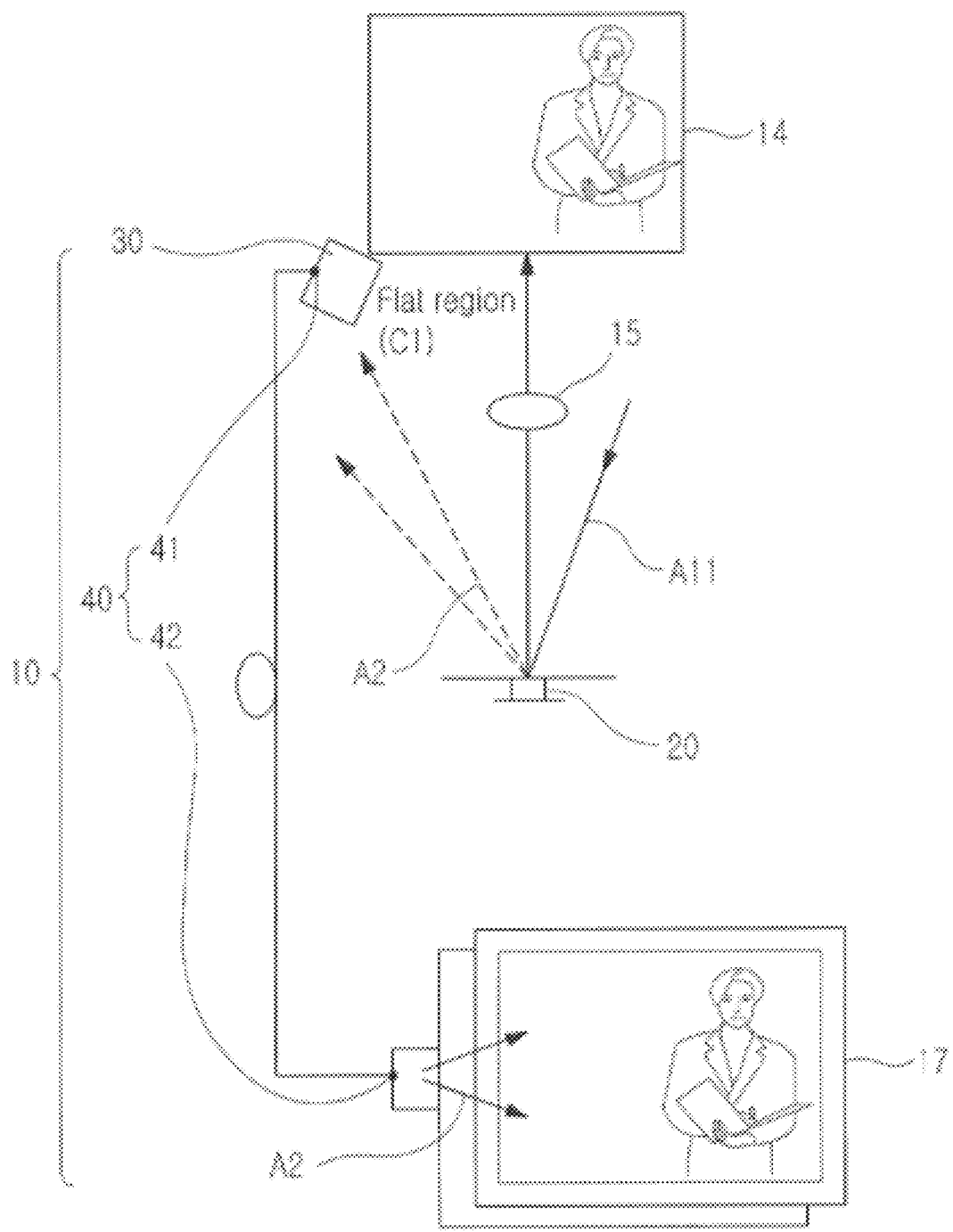
FIG. 4 is a view showing the configuration and the operation state of a light emitting device in an electronic device, provided with a DLP projector and a display unit, according to an embodiment of the present invention.

As shown in FIGS. 3 and 4, a light emitting device 10 of an electronic device, provided with a DLP (Digital Light Processing) projector and a display unit 17, which may include a Liquid Crystal Display (LCD), includes a microscopic mirror 20, a light concentration mirror 30, and an optical fiber 40. The microscopic mirror 20 is provided within the DLP projector (not shown) in such a manner that it can project a light A2 of the DLP projector to a flat area C1 provided ahead of the microscopic mirror 20 in a reset state D11 (an intermediate operation state) of the microscopic mirror 20. The reset state D10 according to the present invention is similar to the reset state D1 illustrated in FIG. 3. The light concentration mirror 30 is provided at a position adjacent to the flat area C1 so as to converge the light A2 projected on the flat area C1, and the optical fiber 40 transmits the light A2 converged by the light concentration mirror 30 to a display unit 17 and allows the light A2 to be used as a backlight light of the display unit 17.

As shown in FIG. 4, one end 41 of the optical fiber 40 is positioned at the light concentration mirror 30 in such a manner that the optical fiber 40 can transfer the light A2 converged by the light concentration mirror 30 to the display unit 17, and the other end 42 of the optical fiber 40 is positioned at the display unit 17 in such a manner that the optical fiber 40 can emit the light A2 on the display unit 17.

The electronic device (not shown) is configured in such a manner that the DLP projector and the display unit 17 can be used at the same time.

When the DLP projector is used, an alternative backlight device (not shown) provided in the display unit 17 is not used. The backlight device may be, but is not limited to, a conventional backlight device. Thus, in the electronic device (not shown), the power consumption of a battery provided in the electronic device can be reduced. On the other hand, when the DLP projector is not used, the alternative backlight device (not shown) is used to radiate the display unit 17.

The electronic device (not shown) may be a device such as a portable communication device. Also, other electronic devices provided with the DLP projector and the display unit 17 may employ the light emitting device 10.

The operation process of a light emitting device of an electronic device provided with a DLP projector and a display unit, according to a preferred embodiment of the present invention, the DLP projector and the display unit employing the above described configuration, is described in detail as follows with reference to FIGS. 3 and 4.

As shown in FIGS. 3 and 4, a light emitting device 10 of an electronic device, provided with a DLP projector and a display unit, which may be an LCD, includes a microscopic mirror 20, a light concentration mirror 30, and an optical fiber 40. In this state where a user uses the DLP projector and the display unit 17 at the same time, as shown in FIGS. 3 and 4, when the DLP projector is driven, the microscopic mirror 20 of the DLP projector is also driven. Herein, the microscopic mirror 20 projects a light A2 of the DLP projector on a flat area C1 provided ahead of the microscopic mirror 20 in a reset state D1 (an intermediate operation state) of the microscopic mirror 20.

The light A2 projected on the flat area C1 is converged with the light concentration mirror 30, and the converged light A2 is transferred to one end 41 of the optical fiber 40.

The light A2 transferred to one end 41 of the optical fiber 40 is transferred to the other end 42 of the optical fiber 40, and also is re-used as a backlight light of the display unit 17.

Herein, an alternative backlight device (not shown) provided in the display unit 17 is not used, and thus, the power consumption of a battery (not shown) provided in the electronic device (not shown) can be reduced.

Herein, when the user does not use the DLP projector, the display unit 17 is used by the operation of the alternative backlight device (not shown).

In this manner, the light A2 which is leaked in the use of the DLP projector, is re-used as a backlight light A2 of the display unit 17 by using the light emitting device. Accordingly, battery consumption is reduced, thereby improving the use of the product. Also, it is possible to use the DLP projector and the display unit 17 at the same time.

The light emitting device of the electronic device, provided with the DLP projector and the display unit of the present invention as described above, is not limited to the above described embodiments and drawings. It will be understood by those skilled in the art that various substitutions, changes, and modifications may be made without departing from the spirit and scope of the invention. Therefore, the scope of the invention is not limited to the embodiments as described above, but is defined by the appended claims and equivalents thereof.

What is claimed is:

1. A light emitting device of an electronic device, provided with a digital light processing projector and a display unit, the light emitting device comprising:
a first mirror for projecting a light of the digital light processing projector on a flat area provided ahead of the first mirror in an intermediate operation state of the first mirror;
a light concentration mirror for converging the light projected on the flat area, the light concentration mirror being provided at a position adjacent to the flat area; and
an optical fiber for transferring the light converged by the light concentration mirror to the display unit and enabling re-use of the transferred light as a backlight light of the display unit.

2. The light emitting device of the electronic device as claimed in claim 1, wherein one end of the optical fiber is positioned at the light concentration mirror, and another end of the optical fiber is positioned at the display unit.

3. The light emitting device of the electronic device as claimed in claim 1, wherein in the electronic device, the digital light processing projector and the display unit are usable at the same time,
wherein when the digital light processing projector is used, an alternative backlight device provided in the display unit is not used, and
wherein, when the digital light processing projector is not used, the alternative backlight device is used.

4. The light emitting device of the electronic device as claimed in claim 1, wherein the electronic device comprises a portable communication device.

5. The light emitting device of the electronic device as claimed in claim 1, wherein the first mirror is a microscopic mirror.

6. The light emitting device of the electronic device as claimed in claim 1, wherein the intermediate operation state is a reset state of the first mirror.

7. A method for providing backlight in an electronic device, the electronic device having a light emitting device provided with a digital light processing projector and a display unit, the method comprising:
projecting, by a first mirror, a light of the digital light processing projector on a flat area provided ahead of the first mirror in an intermediate operation state of the first mirror;
converging, by a light concentration mirror, the light projected on the flat area, the light concentration mirror being provided at a position adjacent to the flat area;
transferring, by an optical fiber, the light converged by the light concentration mirror to the display unit; and
re-using the transferred light as a backlight light of the display unit.

8. The backlight providing method as claimed in claim 7, wherein one end of the optical fiber is positioned at the light concentration mirror, and another end of the optical fiber is positioned at the display unit.

9. The backlight providing method as claimed in claim 7, further comprising:
using an alternative backlight device when the digital light processing projector is not used,
wherein in the electronic device, the digital light processing projector and the display unit are usable at the same time, and
wherein when the digital light processing projector is used, the alternative backlight device provided in the display unit is not used.

10. The backlight providing method as claimed in claim 7, wherein the electronic device comprises a portable communication device.

11. The backlight providing method as claimed in claim 7, wherein the first mirror is a microscopic mirror.

12. The backlight providing method as claimed in claim 7, wherein the intermediate operation state is a reset state of the first mirror.

* * * * *